(12) United States Patent
Mizobata

(10) Patent No.: US 11,705,007 B2
(45) Date of Patent: Jul. 18, 2023

(54) VEHICLE DISPLAY DEVICE

(71) Applicant: TOYOTA JIDOSHA KABUSHIKI KAISHA, Aichi-ken (JP)

(72) Inventor: Hiroshi Mizobata, Seto (JP)

(73) Assignee: TOYOTA JIDOSHA KABUSHIKI KAISHA, Aichi (JP)

( * ) Notice: Subject to any disclaimer, the term of this patent is extended or adjusted under 35 U.S.C. 154(b) by 0 days.

(21) Appl. No.: 17/672,554

(22) Filed: Feb. 15, 2022

(65) Prior Publication Data

US 2022/0262254 A1 Aug. 18, 2022

(30) Foreign Application Priority Data

Feb. 18, 2021 (JP) ................................ 2021-024193

(51) Int. Cl.
*G08G 1/16* (2006.01)
*B60K 35/00* (2006.01)

(52) U.S. Cl.
CPC ............ *G08G 1/167* (2013.01); *B60K 35/00* (2013.01); *B60K 2370/152* (2019.05); *B60K 2370/177* (2019.05); *B60K 2370/52* (2019.05)

(58) Field of Classification Search
CPC .. G08G 1/167; B60K 35/00; B60K 2370/177; B60K 2370/152; B60K 2370/52
See application file for complete search history.

(56) References Cited

U.S. PATENT DOCUMENTS

| 11,069,245 | B2* | 7/2021 | Kim | B60W 60/001 |
|---|---|---|---|---|
| 2002/0133285 | A1* | 9/2002 | Hirasago | B60K 35/00 701/96 |
| 2009/0306852 | A1* | 12/2009 | Ikeda | B60W 50/14 701/36 |
| 2016/0090041 | A1* | 3/2016 | Nagasawa | G06V 20/588 345/7 |
| 2018/0058879 | A1* | 3/2018 | Tayama | B60W 30/16 |
| 2019/0294895 | A1* | 9/2019 | Kleen | G02B 27/01 |
| 2019/0347939 | A1* | 11/2019 | Kim | B60K 35/00 |
| 2020/0031281 | A1* | 1/2020 | Watanabe | G06T 1/00 |
| 2020/0062245 | A1* | 2/2020 | Samotsvet | G06T 7/60 |
| 2020/0064640 | A1* | 2/2020 | Nagano | G09G 3/001 |

(Continued)

FOREIGN PATENT DOCUMENTS

JP 2006171950 A 6/2006
JP 201671666 A 5/2016
(Continued)

*Primary Examiner* — Chico A Foxx
(74) *Attorney, Agent, or Firm* — Hauptman Ham, LLP

(57) ABSTRACT

A vehicle display device includes: a forward image acquiring section that acquires images of a region ahead of a vehicle; a vehicle information acquiring section that acquires vehicle information relating to traveling of the vehicle; a path predicting section that, based on the vehicle information acquired by the vehicle information acquiring section, predicts an own vehicle traveling line that is a traveling path of the vehicle; an ideal path deriving section that, based on the images of the region ahead of the vehicle acquired by the forward image acquiring section, derives an ideal traveling line that is a proper traveling path; and a display control section that displays the own vehicle traveling line and the ideal traveling line so as to be superposed on a view in front of a driver's seat.

10 Claims, 13 Drawing Sheets

(56) References Cited

U.S. PATENT DOCUMENTS

| | | | |
|---|---|---|---|
| 2020/0369149 A1* | 11/2020 | Kassn | B60K 35/00 |
| 2021/0129766 A1* | 5/2021 | Kim | B60R 1/00 |
| 2021/0157330 A1* | 5/2021 | Tran | G06V 20/588 |
| 2022/0063406 A1* | 3/2022 | Endo | B60K 35/00 |
| 2022/0227384 A1* | 7/2022 | Wyszka | B60W 30/12 |
| 2022/0363251 A1* | 11/2022 | Shin | G06V 20/58 |

FOREIGN PATENT DOCUMENTS

| | | | | |
|---|---|---|---|---|
| JP | 2020074000 A | * | 5/2020 | ............ B60K 35/00 |
| KR | 20130072542 A | * | 7/2013 | |
| WO | WO-2012039004 A1 | * | 3/2012 | ............ G08G 1/165 |
| WO | WO-2017018192 A1 | * | 2/2017 | ............ B60K 35/00 |
| WO | 2017082067 A1 | | 5/2017 | |
| WO | WO-2017102136 A1 | * | 6/2017 | ............ B60K 35/00 |
| WO | WO-2018172886 A1 | * | 9/2018 | ............ B60K 35/00 |
| WO | WO-2019150037 A1 | * | 8/2019 | ....... B32B 17/10005 |
| WO | WO-2020208989 A1 | * | 10/2020 | ............ B60K 35/00 |

\* cited by examiner

VEHICLE DISPLAY DEVICE

CROSS-REFERENCE TO RELATED APPLICATION

This application is based on and claims priority under 35 USC 119 from Japanese Patent Application No. 2021-024193 filed on Feb. 18, 2021, the disclosure of which is incorporated by reference herein.

BACKGROUND

Technical Field

The present disclosure relates to a vehicle display device.

Related Art

Japanese Patent Application Laid-Open (JP-A) No. 2016-071666 discloses a sightline guiding device for assisting driving by a driver. In this sightline guiding device, the sightline of the driver is guided to a predicted path by displaying traveling reference marks at the right edge and the left edge of the road along the predicted path of the vehicle.

However, smooth steering cannot be promoted merely by guiding the sightline, and there is room for improvement in order to carry out effective driving assist.

SUMMARY

The present disclosure provides a vehicle display device that can carry out driving assist effectively.

A first aspect of the present disclosure is a vehicle display device including: a forward image acquiring section that acquires images of a region ahead of a vehicle; a vehicle information acquiring section that acquires vehicle information relating to traveling of the vehicle; a path predicting section that, based on the vehicle information acquired by the vehicle information acquiring section, predicts an own vehicle traveling line that is a traveling path of the vehicle; an ideal path deriving section that, based on the images of the region ahead of the vehicle acquired by the forward image acquiring section, derives an ideal traveling line that is a proper traveling path; and a display control section that displays the own vehicle traveling line and the ideal traveling line so as to be superposed on a view in front of a driver's seat.

In the vehicle display device of the first aspect of the present disclosure, images of the region ahead of the vehicle are acquired by the forward image acquiring section. Further, vehicle information is acquired by the vehicle information acquiring section. The path predicting section predicts the own vehicle traveling line of the vehicle based on the acquired vehicle information. The own vehicle traveling line is displayed by the display control section so as to be superposed on the view in front of the driver's seat. Due thereto, the driver may visually confirm the traveling path of the own vehicle. Note that what is called vehicle information here is information relating to traveling of the vehicle such as, for example, the vehicle speed, the acceleration, the steering angle, and the like.

Moreover, the ideal traveling line is derived by the ideal path deriving section, and this ideal traveling line is displayed, together with the own vehicle traveling line and by the display control section, so as to be superposed on the view in front of the driver's seat. Due thereto, the driver may visually recognize the error between the own vehicle traveling line and the ideal traveling line, and can be urged to travel on the ideal traveling line. Note that what is called ideal traveling line here is a concept designating one proper traveling path of the vehicle with respect to the lane in which the vehicle is traveling, and plural traveling lines may be included as the ideal traveling line.

In a second aspect of the present disclosure, in the first aspect, the display control section may stop display of the own vehicle traveling line and the ideal traveling line in a case in which a vehicle speed is less than or equal to a predetermined threshold value.

In the vehicle display device of the second aspect of the present disclosure, display of the own vehicle traveling line and the ideal traveling line is stopped in a traveling scenario in which the vehicle speed is less than or equal to a predetermined threshold value. Due thereto, in a case in which the driver is traveling at a low speed while paying attention to obstacles at the periphery, the driver's eyes being directed toward the display of the own vehicle traveling line and the ideal traveling line may be suppressed.

In a third aspect of the present disclosure, in the first aspect, the display control section may stop display of the own vehicle traveling line and the ideal traveling line in a case in which a predetermined obstacle is sensed in front of the vehicle.

In the vehicle display device of the third aspect of the present disclosure, in a case in which pedestrians and bicycles and the like exist as predetermined obstacles in front of the vehicle such as in a city area or the like, display of the own vehicle traveling line and the ideal traveling line is stopped. Due thereto, the driver may effectively be made to pay attention to obstacles at the periphery. Note that what is called predetermined obstacles here is not limited to obstacles that move such as pedestrians and bicycles and the like, and is a concept that broadly includes obstacles that may affect the implementation of safe driving such as persons who are stationary or objects that have fallen on the road or the like.

In a fourth aspect of the present disclosure, in any one of the first through third aspects, the display control section may display the own vehicle traveling line and the ideal traveling line in different colors.

In the vehicle display device of the fourth aspect of the present disclosure, the driver may distinguish the own vehicle traveling line and the ideal traveling line at a glance.

In a fifth aspect of the present disclosure, in any one of the first through fourth aspects, the display control section may display the own vehicle traveling line and the ideal traveling line in shapes of bands that become narrower and darker from near to far.

In the vehicle display device of the fifth aspect of the present disclosure, the own vehicle traveling line and the ideal traveling line are displayed so as to become narrower from near to far. Further, the own vehicle traveling line and the ideal traveling line are displayed so as to become darker from near to far. Here, it is known that a persons' sightline is naturally led in directions that become narrower and in directions that become become darker. Therefore, the sightline of the driver may naturally be directed toward far off, and driving in which the driver is aware of information of far-off regions can be promoted.

A sixth aspect of the present disclosure, any one of the first through fifth aspects, may further include a notification section that notifies a driver in a case in which the own vehicle traveling line overlaps the ideal traveling line by a predetermined proportion or more.

In the vehicle display device of the sixth aspect of the present disclosure, by notifying the driver that they are traveling on a path that is equivalent to the ideal traveling line, the desire on the part of the driver to travel on the ideal traveling line may be increased.

In a seventh aspect of the present disclosure, in any one of the first through sixth aspects, the display control section may stop display of the own vehicle traveling line and the ideal traveling line for a predetermined time period, in a case in which the own vehicle traveling line overlaps the ideal traveling line by a predetermined proportion or more.

In the vehicle display device of the seventh aspect of the present disclosure, by stopping display of the own vehicle traveling line and the ideal traveling line in a case in which the vehicle is traveling on a path that is equivalent to the ideal traveling line, the annoyance may be reduced as compared with a case in which own vehicle traveling line and the ideal traveling line are always displayed.

An eighth aspect of the present disclosure, any one of the first through seventh aspects, may further include a driving instructing section that outputs, to a driver, an instruction relating to driving operation for causing the own vehicle traveling line to approach the ideal traveling line.

In the vehicle display device of the eighth aspect of the present disclosure, due to the driver driving on the basis of the contents instructed by the driving instructing section, the driver may easily make the traveling path of the vehicle approach the ideal traveling line.

In a ninth aspect of the present disclosure, in any one of the first through eighth aspects, the display control section displays each of the own vehicle traveling line and the ideal traveling line as a single line that extends from a transverse direction central portion of the vehicle.

In the vehicle display device of the ninth aspect of the present disclosure, because the own vehicle traveling line and the ideal traveling line are each displayed as a single line, they are easy for the driver to see, and the driver's sightline going astray may be suppressed.

In a tenth aspect of the present disclosure, in any one of the first through eighth aspects, the display control section may display each of the own vehicle traveling line and the ideal traveling line as a pair of lines that extend from transverse direction both sides of the vehicle.

In the vehicle display device relating to the tenth aspect of the present disclosure, due to the driver looking at the pair of own vehicle traveling lines, the driver can instinctively grasp the transverse direction length of the vehicle.

In an eleventh aspect of the present disclosure, in any one of the first through tenth aspects, the display control section changes a color of the own vehicle traveling line in accordance with an intervehicle distance and a relative speed between an own vehicle and a vehicle ahead that is traveling in front of the own vehicle.

In the vehicle display device relating to the eleventh aspect of the present disclosure, due to the color of the own vehicle traveling line changing, the driver can instinctively grasp that the own vehicle is approaching the vehicle ahead. For example, in a situation in which the intervehicle distance between the own vehicle and the vehicle ahead is becoming shorter, in a case in which the relative speed of the own vehicle with respect to the vehicle ahead is relatively large, the own vehicle traveling line is displayed in a color such as red or the like, and the driver can be urged to decelerate.

As described above, in accordance with the vehicle display device relating to the present disclosure, driving assist can be carried out effectively.

BRIEF DESCRIPTION OF THE DRAWINGS

Exemplary embodiments of the present disclosure will be described in detail based on the following figures, wherein.

DETAILED DESCRIPTION

First Exemplary Embodiment

Figure 1:
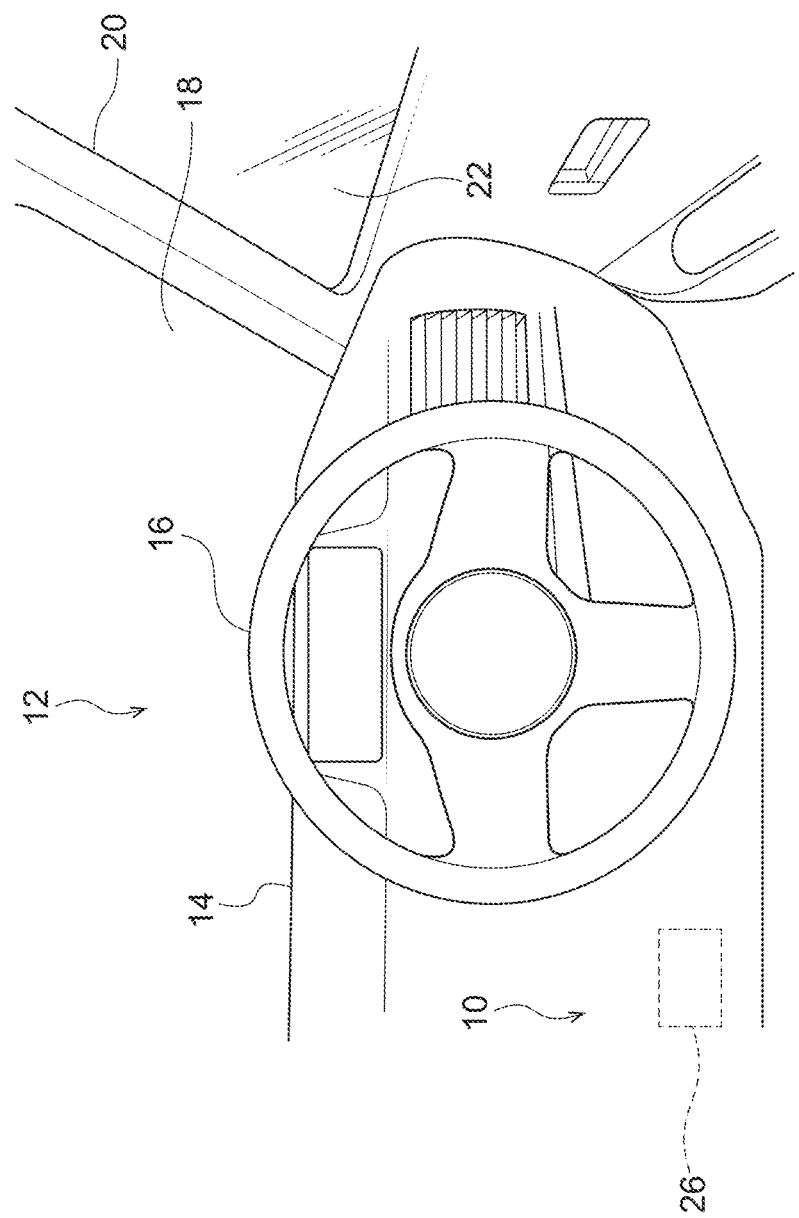
FIG. 1 is a drawing in which the front portion of the vehicle cabin of a vehicle, in which a vehicle display device relating to a first exemplary embodiment is installed, is seen from the rear.

A vehicle 12, to which a vehicle display device 10 relating to a first exemplary embodiment is applied, is described with reference to the drawings. As illustrated in FIG. 1, an instrument panel 14 is provided at the front portion of the vehicle cabin interior of the vehicle 12.

The instrument panel 14 extends in the vehicle transverse direction, and a steering wheel 16 is provided at the vehicle right side of the instrument panel 14. Namely, in the present embodiment, as an example, the vehicle 12 is a right hand drive vehicle in which the steering wheel 16 is provided at the right side, and the driver's seat is set at the vehicle right side.

A windshield glass 18 is provided at the front end portion of the instrument panel 14. The windshield glass 18 extends in the vehicle vertical direction and the vehicle transverse direction, and divides the vehicle cabin interior and the vehicle cabin exterior.

The vehicle right side end portion of the windshield glass 18 is fixed to a front pillar 20 that is at the vehicle right side. The front pillar 20 extends in the vehicle vertical direction. The windshield glass 18 is fixed to the vehicle transverse direction inner side end portion of the front pillar 20. Further, the front end portion of a front side glass 22 is fixed to the vehicle transverse direction outer side end portion of the front pillar 20. Note that the vehicle left side end portion of the windshield glass 18 is fixed to an unillustrated front pillar that is at the vehicle left side.

Figure 2:
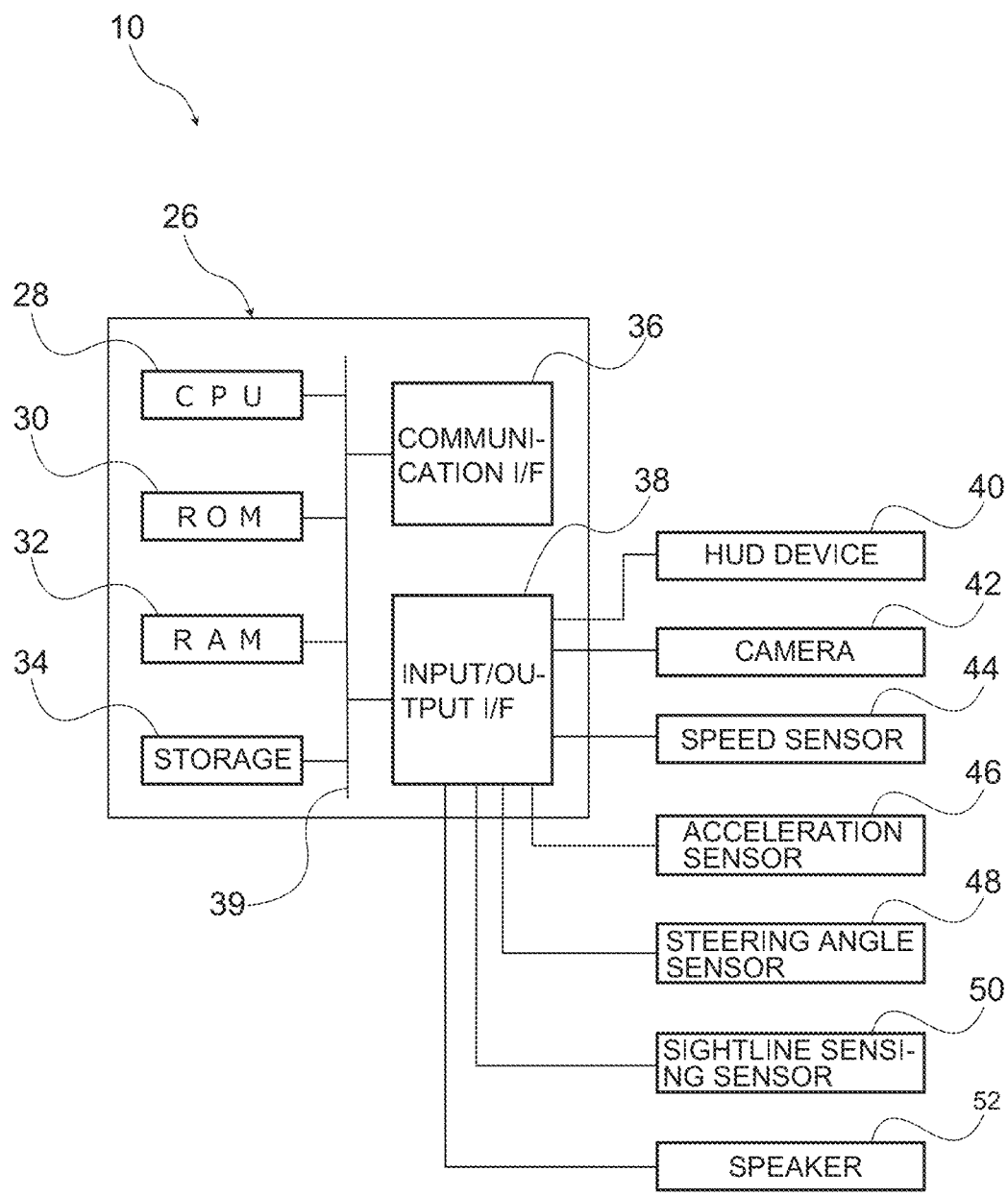
FIG. 2 is a block drawing illustrating hardware structures of the vehicle display device relating to the first exemplary embodiment.

Here, a portion of or the entirety of the windshield glass 18 is made to be a display portion for video images that are projected by a head-up display device 40 that is illustrated in FIG. 2. Concretely, the head-up display device 40 is disposed further toward the vehicle front side than the instrument panel 14, and video images are projected from the head-up display device 40 onto the windshield glass 18. Namely, the present embodiment is structured such that, as an example, video images are projected directly onto the windshield glass 18. Note that a transparent display plate such as a combiner or the like may be set between the driver's seat and the windshield glass 18, and video images may be projected onto this display plate.

Further, the present embodiment is structured such that the video images, which are projected from the head-up display device 40 onto the windshield glass 18, are displayed so as to be superposed on the view that is in front of the driver's seat, and the driver can confirm information in a state of looking at the view ahead. Here, an ECU (Electronic Control Unit) 26 that serves as the control section is provided at the vehicle 12.

(Hardware Structures of Vehicle Display Device 10)

FIG. 2 is a block drawing illustrating hardware structures of the vehicle display device 10. As illustrated in FIG. 2, the ECU 26 of the vehicle display device 10 is structured to include a CPU (Central Processing Unit: processor) 28, a ROM (Read Only Memory) 30, a RAM (Random Access Memory) 32, a storage 34, a communication interface 36 and an input/output interface 38. These structures are connected so as to be able to communicate with one another via a bus 39.

The CPU 28 is a central computing processing unit, and executes various programs and controls respective sections. Namely, the CPU 28 reads-out programs from the ROM 30 or the storage 34, and executes the programs by using the RAM 32 as a workspace. The CPU 28 carries out control of the above-described respective structures, and various computing processings, in accordance with programs that are recorded in the ROM 30 or the storage 34.

The ROM 30 stores various programs and various data. The RAM 32 temporarily stores programs and data as a workspace. The storage 34 is structured by an HDD (Hard Disk Drive) or an SSD (Solid State Drive), and stores various programs, including the operating system, and various data. In the present embodiment, a program for carrying out display control processing, and various data, and the like are stored in the ROM 30 or the storage 34.

The communication interface 36 is an interface for the vehicle display device 10 to carry out communication with unillustrated servers and other equipment, and utilizes standards such as, for example, Ethernet®, LTE, FDDI, Wi-Fi®, or the like.

The head-up display device 40, a camera 42, a speed sensor 44, an acceleration sensor 46, a steering angle sensor 48, a sightline sensing sensor 50, and a speaker 52 are electrically connected to the input/output interface 38.

As described above, the head-up display device 40 projects video images onto the windshield glass 18. The camera 42 is provided at the vehicle 12 and captures images of the region ahead of the vehicle. The images of the region ahead of the vehicle that are captured by the camera 42 are transmitted to the ECU 26.

The speed sensor 44 senses the speed of the vehicle 12. The acceleration sensor 46 senses the acceleration of the vehicle 12. The steering angle sensor 48 senses the steering angle of the vehicle 12. The vehicle speed, the acceleration and the steering angle that are sensed by the speed sensor 44, the acceleration sensor 46 and the steering angle sensor 48 are transmitted to the ECU 26.

The sightline sensing sensor 50 is provided at the instrument panel 14 or the like for example, and senses the sightline direction of the driver, and transmits that information to the ECU 26. The speaker 52 outputs a voice into the vehicle cabin interior.

(Functional Structures of Vehicle Display Device 10)

The vehicle display device 10 realizes various functions by using the above-described hardware resources. The functional structures realized by the vehicle display device 10 are described with reference to FIG. 3.

Figure 3:
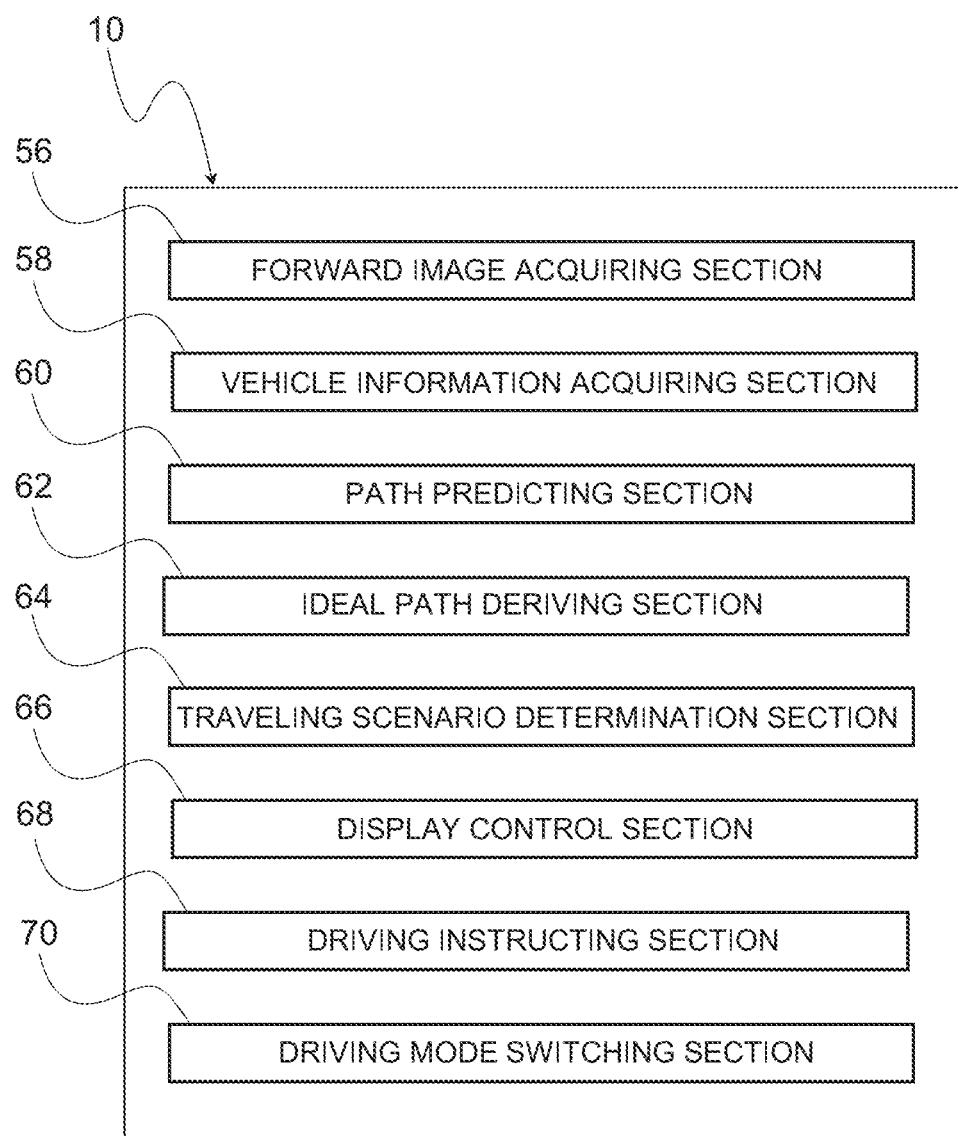
FIG. 3 is a block drawing illustrating functional structures of the vehicle display device relating to the first exemplary embodiment.

As illustrated in FIG. 3, the vehicle display device 10 is structured to include, as the functional structures thereof, a forward image acquiring section 56, a vehicle information acquiring section 58, a path predicting section 60, an ideal path deriving section 62, a traveling scenario determination section 64, a display control section 66, a driving instructing section 68 and a driving mode switching section 70. Note that these respective functional structures are realized by the CPU 28 reading-out a program that is stored in the ROM 30 or the storage 34, and executing the program.

The forward image acquiring section 56 acquires images of the region ahead of the vehicle. Concretely, the images that are captured by the camera 42 are acquired. At this time, the forward image acquiring section 56 may acquire images that result from subjecting the images captured by the camera 42 to predetermined image processings.

The vehicle information acquiring section 58 acquires vehicle information relating to traveling of the vehicle 12. In the present embodiment, as an example, information including the vehicle speed, the acceleration and the steering angle that are sensed by the speed sensor 44, the acceleration sensor 46 and the steering angle sensor 48 are acquired.

The path predicting section 60 predicts the own vehicle traveling line that is the traveling path of the vehicle 12, on the basis of the vehicle information acquired by the vehicle information acquiring section 58. Further, the path predicting section 60 may predict the own vehicle traveling line by additionally using information such as the current position of the vehicle 12 obtained by a GPS (Global Positioning System) device, the traveling path of the vehicle 12 obtained by the navigation system, and the like.

The ideal path deriving section 62 derives an ideal traveling line, which is a proper traveling path, on the basis of the images of the region ahead of the vehicle that are acquired by the forward image acquiring section 56. The ideal traveling line indicates a proper traveling path of the vehicle 12 with respect to the traveling lane. Further, the ideal path deriving section 62 of the present embodiment is structured so as to, as an example, derive two types of ideal traveling lines that are an ideal traveling line for a driver whose driving skill level is relatively low and an ideal traveling line for a driver whose driving skill level is relatively high.

Note that the ideal path deriving section 62 derives the ideal traveling line on the basis of information such as, for example, the degree of curving of a curve ahead of the vehicle that is detected from the images of the region ahead of the vehicle, the width of the lane, and the like. Further, in addition to the above-described degree of curving of the curve, the ideal path deriving section 62 may derive the ideal traveling line by referring to information relating to the curve that is obtained from map information.

The traveling scenario determination section 64 determines the situation in which the vehicle 12 is traveling. Concretely, on the basis of information from the speed sensor 44, the traveling scenario determination section 64 determines whether or not there is a low-speed scenario in which the vehicle speed is less than or equal to a predetermined threshold value. Further, on the basis of the images of the region ahead of the vehicle that are captured by the camera 42, in a case in which a predetermined obstacle is sensed in front of the vehicle, the traveling scenario determination section 64 determines that there is a low-speed scenario in which the vehicle is traveling at a low-speed such as in a city area or the like. Moreover, from information of road signs or the like, the traveling scenario determination section 64 may determine that there is a low-speed scenario in which the speed limit is less than or equal to a predetermined value.

The display control section 66 displays the own vehicle traveling line and the ideal traveling line so as to be superposed on the view that is in front of the driver's seat. Concretely, the display control section 66 converts the own vehicle traveling line predicted by the path predicting section 60 and the ideal traveling line derived by the ideal path deriving section 62 into image information respectively, and projects images onto the windshield glass 18 by the head-up display device 40.

Figure 4:
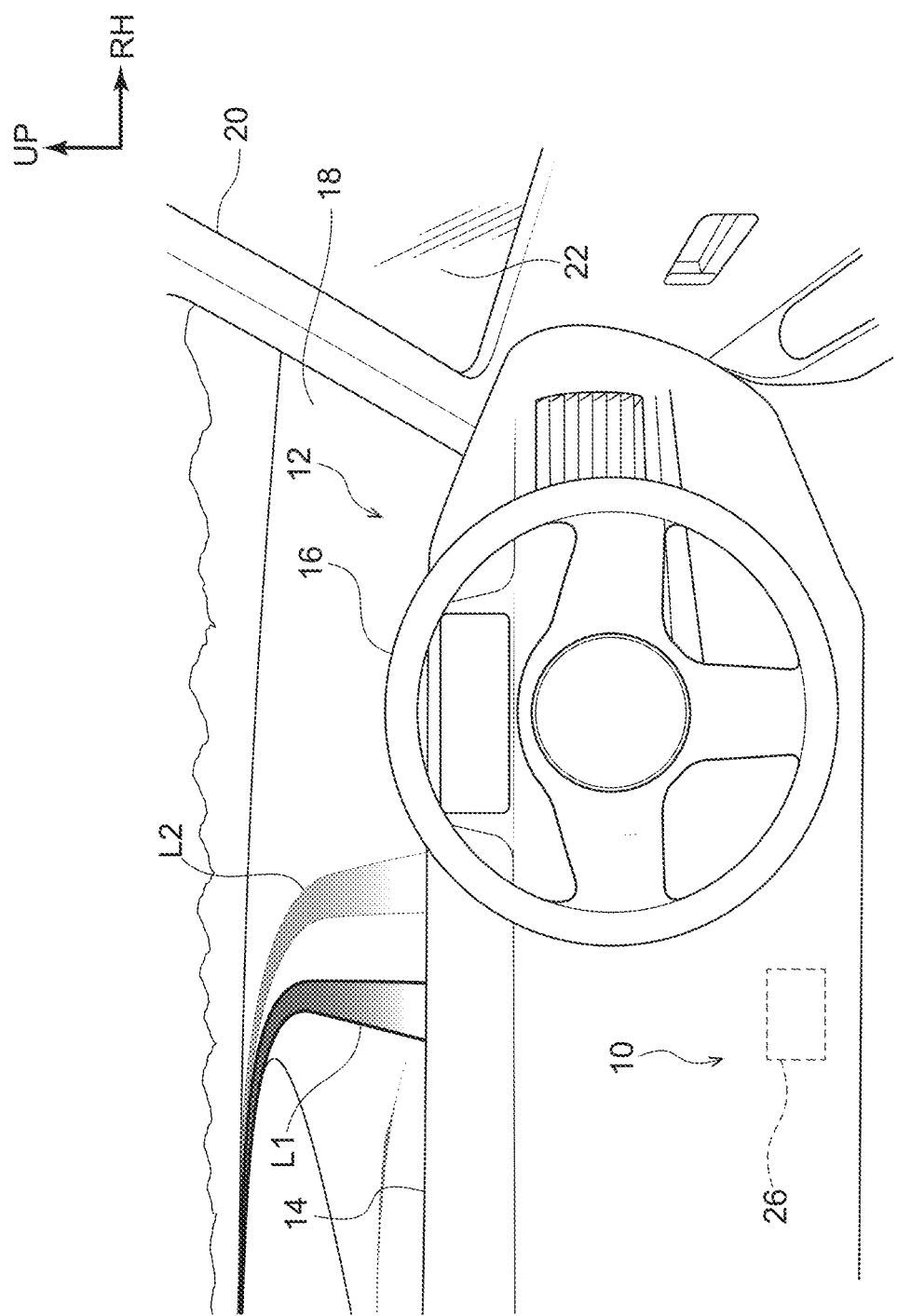
FIG. 4 is a drawing illustrating an example of display of an own vehicle traveling line and an ideal traveling line in the first exemplary embodiment.

An example of display of an own vehicle traveling line L1 and an ideal traveling line L2 is illustrated in FIG. 4. As illustrated in FIG. 4, the own vehicle traveling line L1 and the ideal traveling line L2 are each displayed as a single line that extends from the transverse direction central portion of the vehicle 12. Further, the own vehicle traveling line L1 and the ideal traveling line L2 are displayed by the display control section 66 in the forms of bands that become narrower and darker from near to far.

Moreover, the own vehicle traveling line L1 and the ideal traveling line L2 are displayed in different colors. Note that the own vehicle traveling line L1 and the ideal traveling line L2 may be displayed in different gradation patterns or the like.

Here, each of the own vehicle traveling line L1 and the ideal traveling line L2 is displayed as if moving from the vehicle 12 side toward a region ahead of the vehicle. This movement of the own vehicle traveling line L1 and the ideal traveling line L2 is described with reference to FIG. 5A through FIG. 5C.

Figure 5:
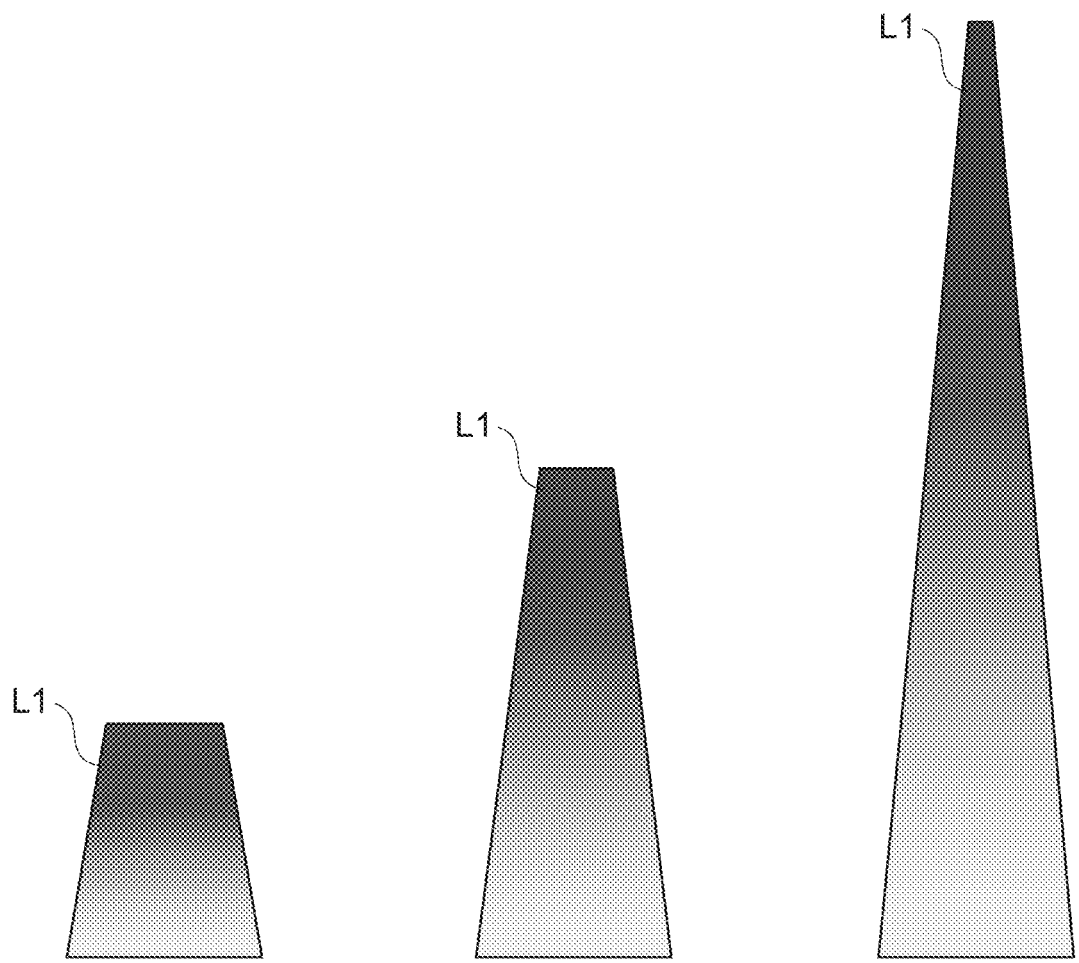
FIG. 5A is a drawing for explaining the state of display of the own vehicle traveling line in the first exemplary embodiment, and illustrates the own vehicle traveling line at a predetermined time.
FIG. 5B illustrates a state in which a predetermined time has elapsed from the state of FIG. 5A.
FIG. 5C illustrates a state in which a predetermined time has elapsed from the state of FIG. 5B.

Examples of display of the own vehicle traveling line L1 are illustrated in FIG. 5A through FIG. 5C. As illustrated in FIG. 5A, in the state immediately after display, the own vehicle traveling line L1 is displayed in the form of a substantial trapezoid whose length is short. Here, the own vehicle traveling line L1 is displayed such that the portion where the tip is narrow appears to be far ahead. In a state in which predetermined time period has elapsed and the own vehicle traveling line L1 extends toward the region ahead of the vehicle from the shape of FIG. 5A as time passes, the own vehicle traveling line L1 becomes the state illustrated in FIG. 5B. Moreover, in a state in which a predetermined time period has elapsed from the shape of FIG. 5B, the own vehicle traveling line L1 becomes the shape of FIG. 5C. Then, the own vehicle traveling line L1 transitions from the state of FIG. 5C to the state of FIG. 5A, and the shapes of FIG. 5A through FIG. 5C are repeatedly displayed. In this way, the display control section 66 displays the own vehicle traveling line L1 as if it is moving from the vehicle 12 side toward a region ahead of the vehicle.

Moreover, the present embodiment is structured such that, by the function of the display control section 66, the color of the own vehicle traveling line L1 is changed in accordance with the intervehicle distance and the relative speed between the vehicle 12 and a vehicle ahead that is traveling in front of the vehicle 12. The intervehicle distance and the relative speed between the vehicle 12 and the vehicle ahead are sensed by using, for example, the camera 42 and sensors such as a laser radar or the like that are provided at the vehicle 12. Then, in a case in which the relative speed of the vehicle 12 with respect to the intervehicle distance between the vehicle 12 and the vehicle ahead is fast, the own vehicle traveling line L1 is changed to a color that urges deceleration, such as red or the like.

Still further, in a case in which the traveling scenario determination section 64 determines that there is a low-speed scenario, the display control section 66 of the present embodiment stops display of the own vehicle traveling line L1 and the ideal traveling line L2. Concretely, in cases such as a case in which it is determined by the traveling scenario determination section 64 that the vehicle speed is less than or equal to a predetermined threshold value, and a case in which a predetermined obstacle is sensed in front of the vehicle, and the like, the display control section 66 stops the display of the own vehicle traveling line L1 and the ideal traveling line L2. In addition, the display control section 66 may stop the display of the own vehicle traveling line L1 and the ideal traveling line L2 similarly in a case in which the traveling scenario determination section 64 determines that the speed limit is less than or equal to a predetermined value.

Figure 6:
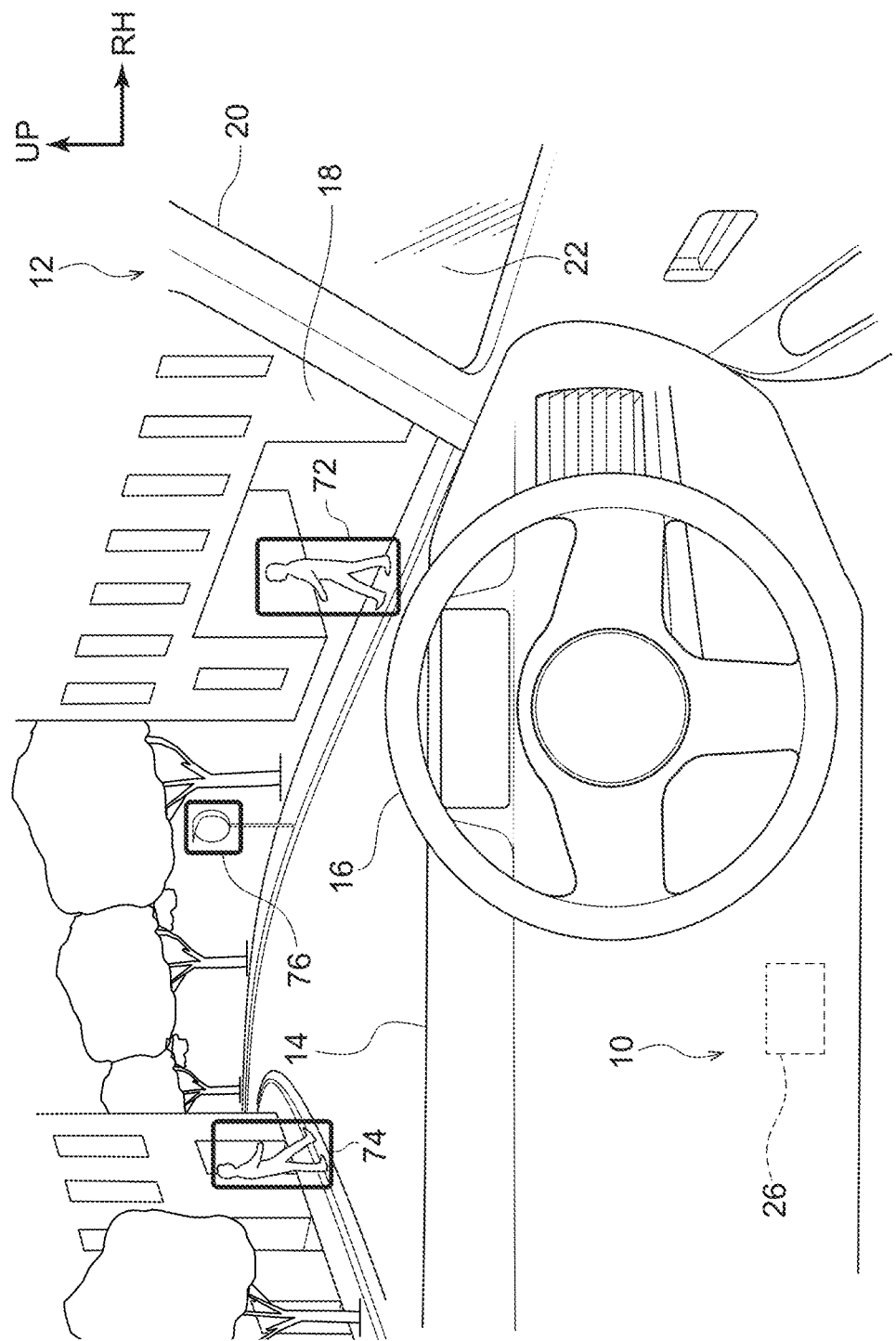
FIG. 6 is a drawing illustrating an example of display at a time of traveling when traveling in a city area in the first exemplary embodiment.

FIG. 6 is a drawing illustrating an example of display of a video image that is displayed on the windshield glass 18 in a case in which the vehicle is traveling in a city area that is an example of a low-speed scenario. As illustrated in FIG. 6, in a low-speed scenario, the own vehicle traveling line L1 and the ideal traveling line L2 are not displayed. Further, in a low-speed scenario, frame-like marks are displayed so as to surround obstacles that are at the periphery of the vehicle 12. Mark 72 and mark 74 surround pedestrians. Further, mark 76 surrounds a traffic curve mirror. In this way, in a case in which an obstacle such as a pedestrian or the like is sensed from the images captured by the camera 42, the display control section 66 displays the mark 72 and the mark 74 so as to direct the driver's sightline toward the obstacles. Further, in a case in which a place toward which the driver's eyes must be directed, such as a traffic curve mirror or the like, is sensed from the images captured by the camera 42, the display control section 66 displays the mark 76. The display control section 66 may display marks at bicycles that are traveling or at road signs or the like.

As illustrated in FIG. 3, by at least one of voice and display, the driving instructing section 68 outputs, to the driver, the instructions relating to driving operations for causing the own vehicle traveling line L1 to approach the ideal traveling line L2. In the present embodiment, as an example, the driving instructing section 68 outputs, to the driver, the instructions relating to driving operations by voice from the speaker 52. For example, in the situation that is illustrated in FIG. 4, the ideal traveling line L2 is displayed further toward the right side than the own vehicle traveling line L1. In this case, the driving instructing section 68 gives a voice instruction that the vehicle 12 should travel further toward the left side. Further, the driving instructing section 68 may give instructions relating to accelerating and decelerating or the like so that the vehicle 12 can travel along the ideal traveling line L2.

The driving mode switching section 70 switches the driving mode of the vehicle 12. In the present embodiment, as an example, the driving mode switching section 70 is structured so as to switch the driving mode between a normal driving mode and an expert driving mode. Further, in a case in which the time period or the stretch in which the own vehicle traveling line L1 coincides with the ideal traveling line L2 is long, the driving mode switching section 70 switches the driving mode from the normal driving mode to the expert driving mode.

Here, the ideal traveling line L2 that is displayed on the windshield glass 18 is different in the normal driving mode and the expert driving mode. Namely, in the normal driving mode, the ideal path deriving section 62 derives an ideal traveling line for a driver whose driving skill level is relatively low. Concretely, in the normal driving mode, the display control section 66 displays the ideal traveling line L2 such that the vehicle 12 always travels in the center of the lane. On the other hand, in the expert driving mode, the ideal path deriving section 62 derives an ideal traveling line for a driver whose driving skill level is relatively high. Concretely, in the expert driving mode, the display control section 66 displays, as the ideal traveling line L2, a traveling line that is offset further toward the left or the right than the center of the lane, in accordance with the situation. For example, the ideal traveling line L2 is displayed such that the vehicle 12 travels along a so-called out-in-out course in which the vehicle 12 enters into a curve from further toward the outer side than the center of the lane, and, after passing through the inner side of the curve, travels at the outer side of the lane.

The driving mode switching section 70 may switch the driving mode on the basis of information such as the vehicle speed or the place where the vehicle 12 is traveling or the like.

(Operation)

Operation of the present embodiment is described next.

(Example of Display Control Processing)

Figure 7:
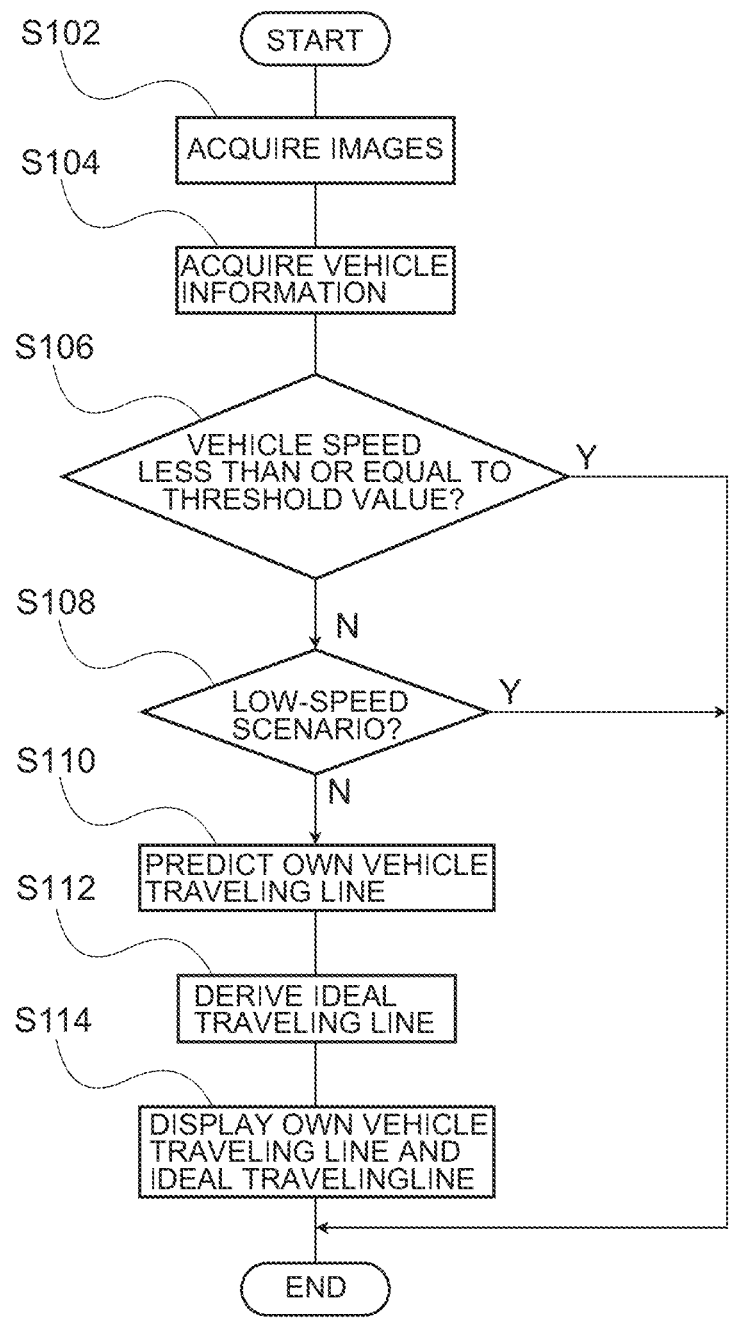
FIG. 7 is a flowchart illustrating an example of display control processing in the first exemplary embodiment.

FIG. 7 is a flowchart illustrating an example of the flow of display control processing by the vehicle display device 10. This display control processing is executed by the CPU 28 of the ECU 26 reading-out a program from the ROM 30 or the storage 34, and expanding the program in the RAM 32.

As illustrated in FIG. 7, in step S102, the CPU 28 acquires images of the region ahead of the vehicle. Concretely, by the function of the forward image acquiring section 56, the CPU 28 acquires the images captured by the camera 42.

In step S104, by the function of the vehicle information acquiring section 58, the CPU 28 acquires vehicle information. Next, in step S106, the CPU 28 determines whether or not the vehicle speed is less than or equal to a threshold value. The threshold value of the vehicle speed is set to the speed at the time when the vehicle 12 travels while particular attention is being paid to the surroundings. For example, the threshold value of the vehicle speed may be set to a speed from around 30 km/h to 40 km/h.

In a case in which the vehicle speed sensed by the speed sensor 44 is less than or equal to the threshold value, the CPU 28 ends the display control processing. Namely, in a case in which the vehicle speed is less than or equal to the threshold value, the own vehicle traveling line L1 and the ideal traveling line L2 are not displayed. On the other hand, in a case in which the vehicle speed is greater than the threshold value, the CPU 28 moves on to the processing of step S108.

In step S108, the CPU 28 determines whether or not the traveling scenario is a low-speed scenario. In a case in which is it determined by the function of the traveling scenario determination section 64 that there is a low-speed scenario, the CPU 28 ends the display control processing. On the other hand, in a case in which there is not a low-speed scenario, the CPU 28 moves on to the processing of step S110.

In step S110, by the function of the path predicting section 60, the CPU 28 predicts the own vehicle traveling line L1. Next, in step S112, by the function of the ideal path deriving section 62, the CPU 28 derives the ideal traveling line L2.

In step S114, the CPU 28 displays the own vehicle traveling line L1 and the ideal traveling line L2 on the windshield glass 18. Concretely, by the function of the display control section 66, the CPU 28 displays the own vehicle traveling line L1 and the ideal traveling line L2 so as to be superposed on the view in front of the driver's seat by using the head-up display device 40. Then, the CPU 28 ends the display control processing.

As described above, in the present embodiment, the own vehicle traveling line L1 of the vehicle 12 is predicted on the basis of the vehicle information, and the own vehicle traveling line L1 is displayed so as to be superposed on the view in front of the driver's seat by the display control section 66. Due thereto, the driver can visually confirm the traveling path of the vehicle 12.

Further, in the present embodiment, the ideal traveling line L2 is derived by the ideal path deriving section 62, and the ideal traveling line L2 is displayed so as to be superposed on the view in front of the driver's seat together with the own vehicle traveling line L1 by the display control section 66. Due thereto, the driver can visually confirm the ideal traveling path, and can be urged to travel on the ideal traveling path. As a result, driving assist can be carried out effectively.

Moreover, in the present embodiment, the display of the own vehicle traveling line L1 and the ideal traveling line L2 is stopped in traveling scenarios in which the vehicle speed is less than or equal to a predetermined threshold value. Due thereto, in a case in which the vehicle 12 is traveling at a low speed while the driver is paying attention to obstacles at the periphery, the driver directing his/her eyes toward the display of the own vehicle traveling line L1 and the ideal traveling line L2 can be suppressed.

Still further, in the present embodiment, in a case in which pedestrians and bicycles and the like exist as predetermined obstacles in front of the vehicle such as in a city area or the like, display of the own vehicle traveling line L1 and the ideal traveling line L2 is stopped. Due thereto, the driver can effectively be made to pay attention to obstacles at the periphery.

In particular, in the present embodiment, as illustrated in FIG. 6, in a state in which display of the own vehicle traveling line L1 and the ideal traveling line L2 is stopped, the mark 72 and the mark 74 that surround obstacles such as pedestrians and the like are displayed. Further, the mark 76 that surrounds a traffic curve mirror or the like and is for causing the driver to pay attention is displayed. Due thereto, the driver can be made to direct his/her gaze toward an appropriate place.

Further, in the present embodiment, as illustrated in FIG. 4, by displaying the own vehicle traveling line L1 and the ideal traveling line L2 in different colors, the driver can distinguish the own vehicle traveling line L1 and the ideal traveling line L2 at a glance. Moreover, because the own vehicle traveling line L1 and the ideal traveling line L2 are each displayed as a single line, they are easy for the driver to see, and the driver's sightline going astray can be suppressed.

Further, in the present embodiment, the own vehicle traveling line L1 and the ideal traveling line L2 are displayed so as to become narrower and darker from near to far. Due thereto, the sightline of the driver can be naturally directed toward far off, and driving in which the driver is aware of information of far-off regions can be promoted.

Moreover, in the present embodiment, the driving instructing section 68 gives the driver voice instructions relating to driving operations for causing the own vehicle traveling line L1 to approach the ideal traveling line L2. Due thereto, due to the driver driving on the basis of the contents instructed by the driving instructing section 68, the driver can easily make the traveling path of the vehicle 12 approach the ideal traveling line.

Still further, in the present embodiment, the color of the own vehicle traveling line L1 is changed in accordance with the intervehicle distance and the relative speed between the vehicle 12 and the vehicle ahead that is traveling in front. Due thereto, for example, in a case in which the relative speed of the own vehicle with regard to the vehicle ahead is relatively high regardless of the fact that the intervehicle distance between the own vehicle and the vehicle ahead is becoming shorter, deceleration can be urged by displaying the own vehicle traveling line in a color such as red or the like.

(Modified Example)

Note that, although the display control section 66 of the above-described embodiment displays the own vehicle traveling line L1 and the ideal traveling line L2 each as a single, thin line that extends from the transverse direction central portion of the vehicle 12 as illustrated in FIG. 4, the present disclosure is not limited to this. For example, the structure of the modified example illustrated in FIG. 8 may be employed.

Figure 8:
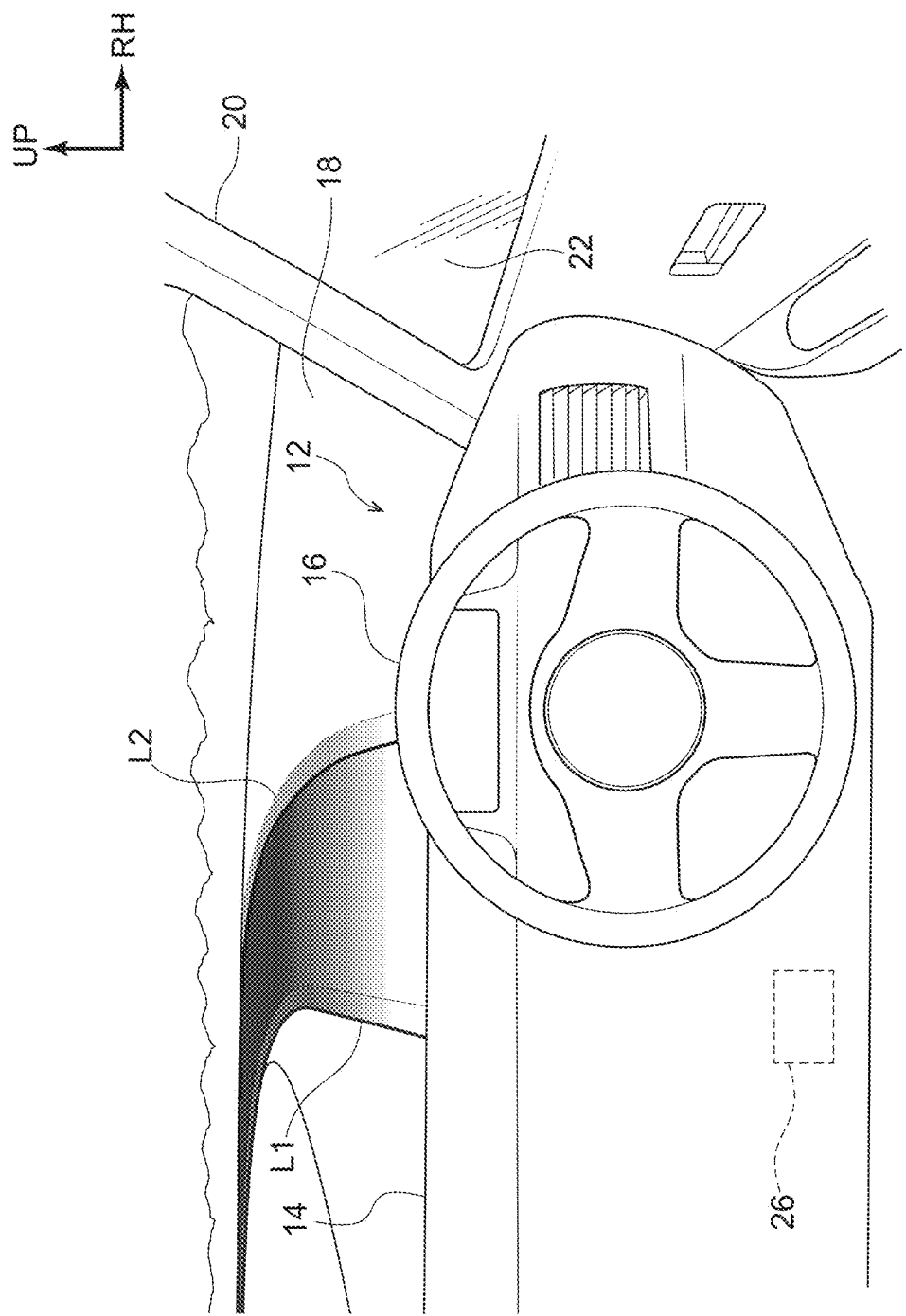
FIG. 8 is a drawing illustrating an example of display of the own vehicle traveling line and the ideal traveling line in a modified example of the first exemplary embodiment.

As illustrated in FIG. 8, in the present modified example, the widths of the own vehicle traveling line L1 and the ideal traveling line L2 are displayed more thickly than in the embodiment. Concretely, the own vehicle traveling line L1 and the ideal traveling line L2 are displayed at thicknesses that correspond to the width between the left and right tires of the vehicle 12. The other structures are similar to those of the above-described embodiment.

In the structure relating to the present modified example, the driver can instinctively grasp the width between the tires of the vehicle 12. Due thereto, even in a case in which the driver is driving a vehicle that he/she is unaccustomed to driving, the driver can drive the vehicle safely.

Second Exemplary Embodiment

A vehicle display device 80 relating to a second exemplary embodiment is described next with reference to the drawings. Note that structures that are similar to the first exemplary embodiment are denoted by the same reference numerals, and description thereof is omitted as appropriate. Further, the hardware structures of the vehicle display device 80 of the present embodiment are similar to those of the first exemplary embodiment that are illustrated in FIG. 2.

Figure 9:
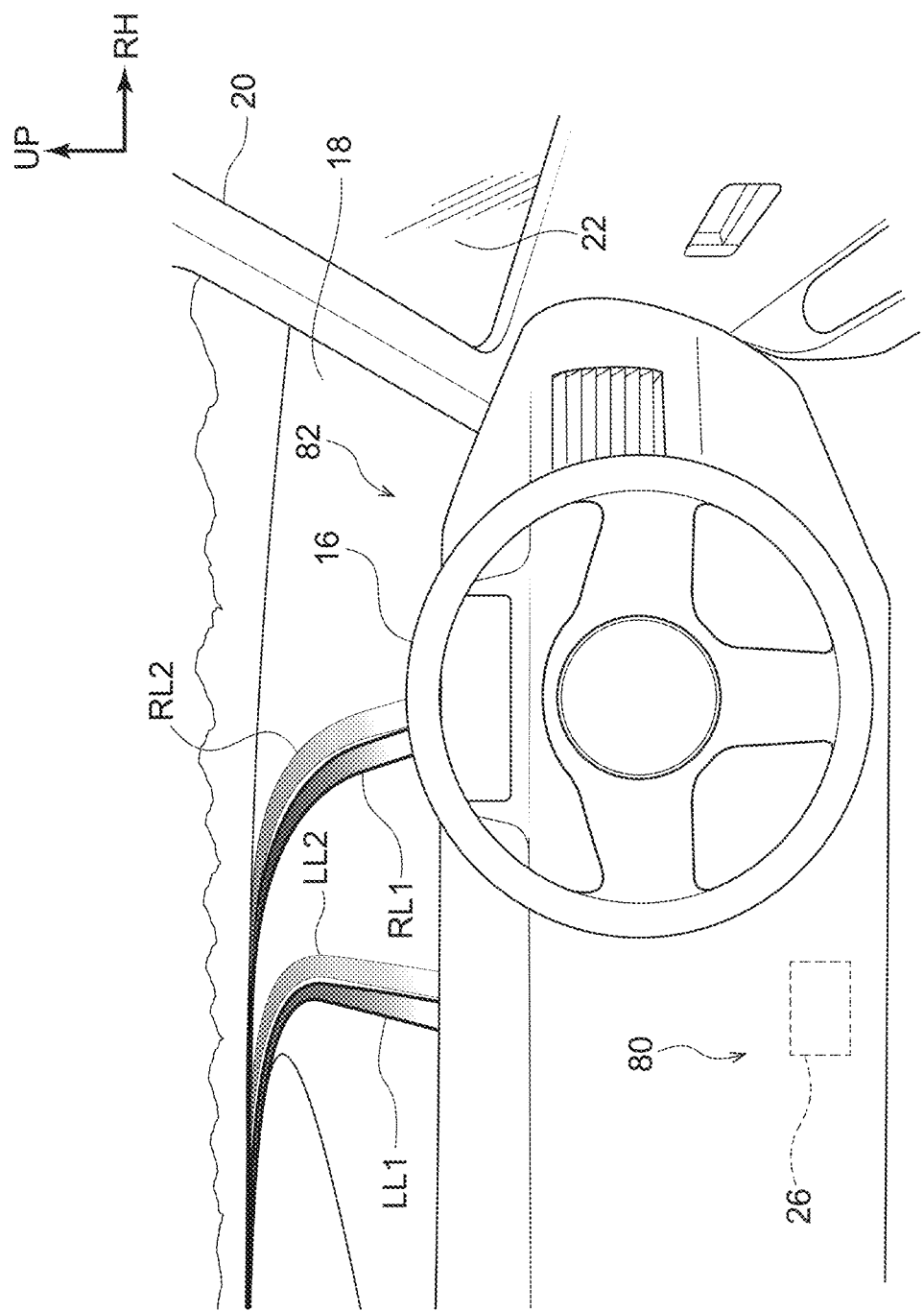
FIG. 9 is a drawing in which the front portion of the vehicle cabin of a vehicle, in which a vehicle display device relating to a second exemplary embodiment is installed, is seen from the rear, and illustrates a state in which own vehicle traveling lines and ideal traveling lines are displayed.

As illustrated in FIG. 9, a left-right pair of own vehicle traveling lines RL1, LL1 and a left-right pair of ideal traveling lines RL2, LL2 are displayed on the windshield glass 18 of a vehicle 82 in which the vehicle display device 80 of the present embodiment is installed.

The own vehicle traveling lines RL1, LL1 and the ideal traveling lines RL2, LL2 are displayed in the forms of bands that become narrower and darker from near to far. Further, the own vehicle traveling lines RL1, LL1 and the ideal traveling lines RL2, LL2 are displayed as if moving from the vehicle 82 side toward a region ahead of the vehicle.

Figure 11:
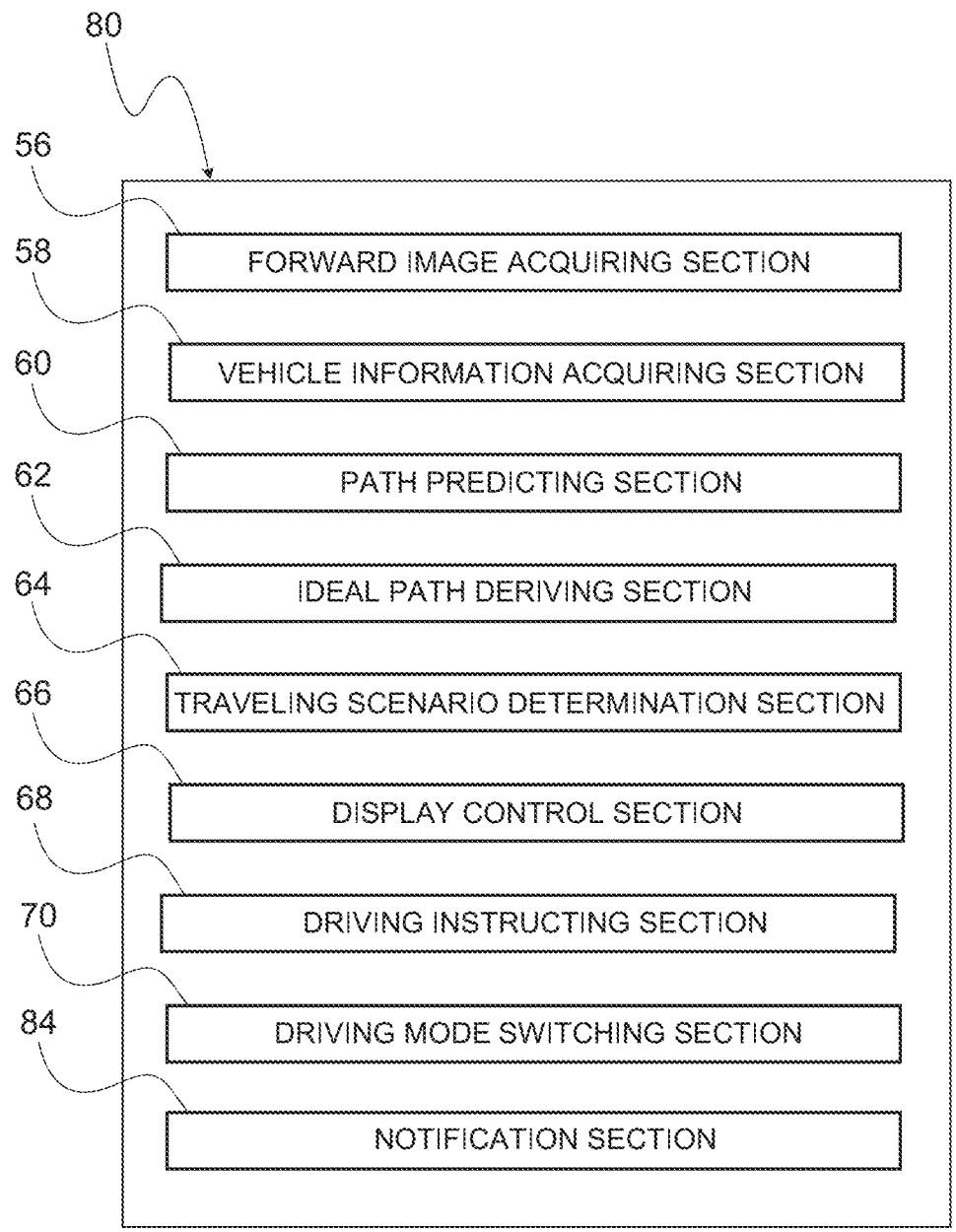
FIG. 11 is a block drawing illustrating functional structures of the vehicle display device relating to the second exemplary embodiment.

As illustrated in FIG. 11, in the same way as in the first exemplary embodiment, the vehicle display device 80 of the present embodiment is structured to include the forward image acquiring section 56, the vehicle information acquiring section 58, the path predicting section 60, the ideal path deriving section 62, the traveling scenario determination section 64, the display control section 66, the driving instructing section 68 and the driving mode switching section 70. Further, the vehicle display device 80 of the present embodiment has a notification section 84 as a functional structure thereof.

Here, the display control section 66 of the present embodiment converts the own vehicle traveling lines predicted by the path predicting section 60 and the ideal traveling lines derived by the ideal path deriving section 62 into image information respectively, and projects images onto the windshield glass 18 by the head-up display device 40. Concretely, as illustrated in FIG. 9, the display control section 66 displays the own vehicle traveling lines RL1, LL1 and the ideal traveling lines RL2, LL2 as pairs of lines that extend from the transverse direction both sides of the vehicle 82, respectively.

The own vehicle traveling line RL1 at the right side is the traveling line on which the right front wheel of the vehicle 82 travels, and the own vehicle traveling line LL1 at the left side is the traveling line on which the left front wheel travels. Further, the ideal traveling line RL2 at the right side is the ideal traveling line of the right front wheel of the vehicle 82, and the ideal traveling line RL2 at the left side is the ideal traveling line of the left front wheel of the vehicle 82.

In a case in which the own vehicle traveling lines overlap the ideal traveling lines by a predetermined proportion or more, the notification section 84 illustrated in FIG. 11 notifies the driver by at least one of voice and display. In the present embodiment, as an example, the notification section 84 notifies the driver by both voice and display from the head-up display device 40 and the speaker 52 that are illustrated in FIG. 2.

Figure 10:
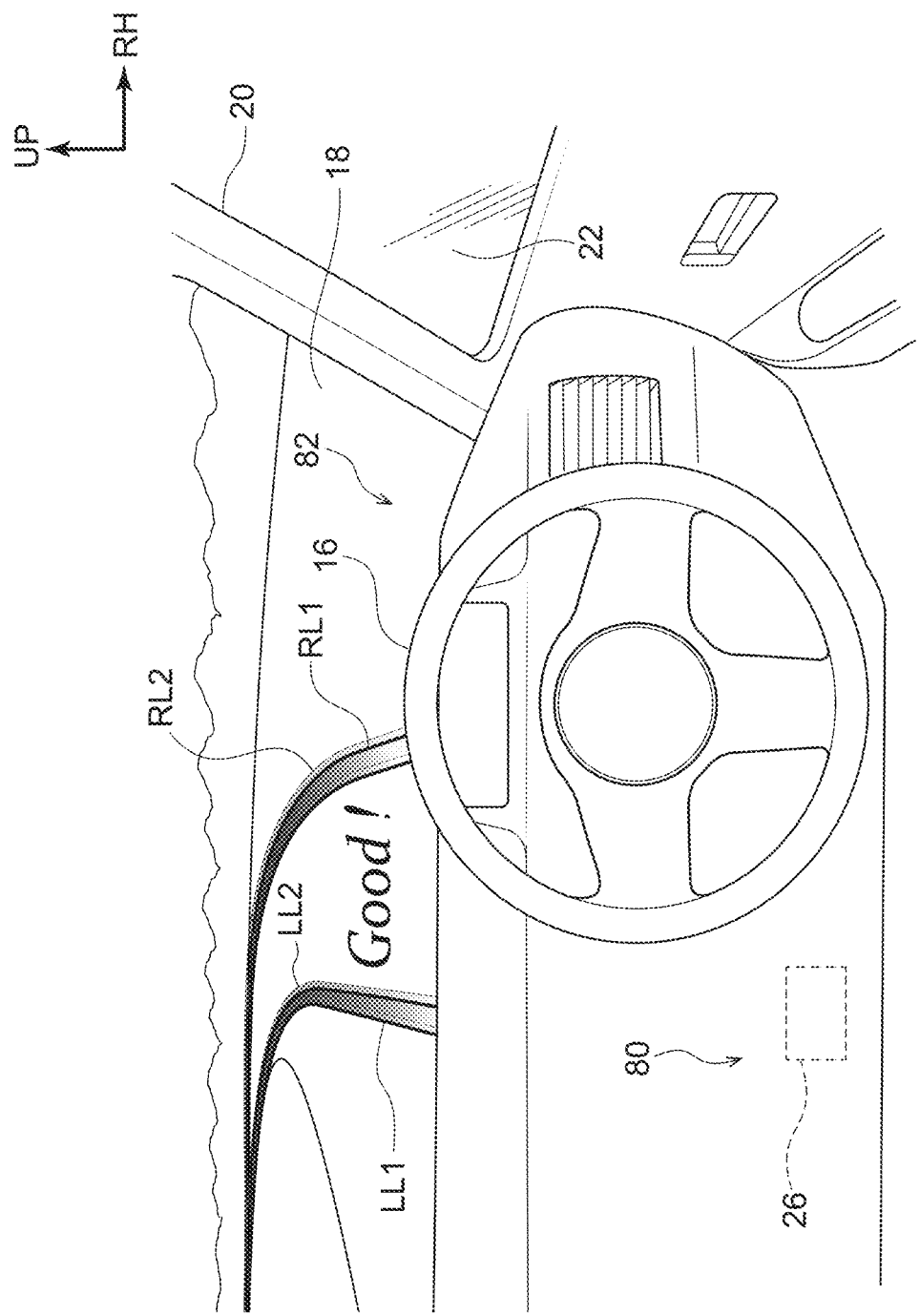
FIG. 10 is a drawing illustrating an example of display in a case in which, from the state of FIG. 9, the own vehicle traveling lines overlap the ideal traveling lines.

An example of display in a case in which the own vehicle traveling lines overlap the ideal traveling lines by a predetermined proportion or more is illustrated in FIG. 10. Concretely, the own vehicle traveling line RL1 and the ideal traveling line RL2 overlap one another by a predetermined proportion or more, and the own vehicle traveling line LL1 and the ideal traveling line LL2 overlap one another by a predetermined proportion or more.

In this state, the notification section 84 notifies the driver, by a voice from the speaker 52, that the vehicle 12 is traveling on the ideal traveling lines. Further, the notification section 84 may output, from the speaker 52, a sound effect that makes the driver feel good. Further, by the notification section 84, the word "Good!" is projected from the head-up display device 40 onto the windshield glass 18.

(Operation)

Operation of the present embodiment is described next.

(Example of Display Control Processing)

Figure 12:
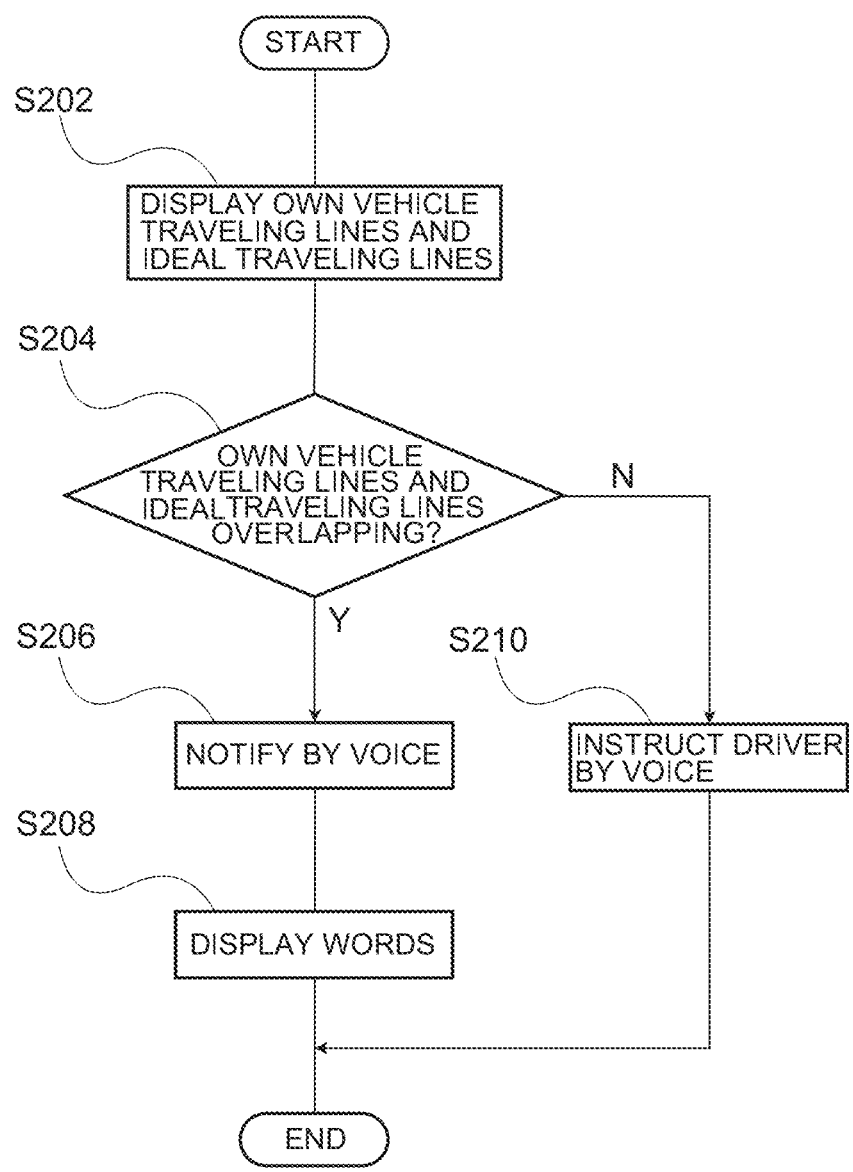
FIG. 12 is a flowchart illustrating an example of display control processing in the second exemplary embodiment.

FIG. 12 is a flowchart illustrating an example of the flow of display control processing by the vehicle display device 80. This display control processing is executed by the CPU 28 of the ECU 26 reading-out a program from the ROM 30 or the storage 34, and expanding the program in the RAM 32.

As illustrated in FIG. 12, in step S202, the CPU 28 displays the own vehicle traveling lines and the ideal traveling lines on the windshield glass 18. Note that, although not illustrated in FIG. 12, before step S202, the CPU 28 carries out the processings from step S102 to step S112 that were described in the first exemplary embodiment.

In step S204, the CPU 28 determines whether or not the own vehicle traveling lines and the ideal traveling lines overlap by a predetermined proportion or more. As an example, the CPU 28 compares the coordinate positions that indicate the own vehicle traveling lines predicted by the path predicting section 60 and the coordinate positions that indicate the ideal traveling lines derived by the ideal path deriving section 62. Then, in a case in which the coordinate positions of the own vehicle traveling lines and the coordinate positions of the ideal traveling lines are closer than a predetermined interval, the CPU 28 determines that the own vehicle traveling lines overlap the ideal traveling lines, and moves on to the processing of step S206.

On the other hand, in step S204, in a case in which the coordinate positions of the own vehicle traveling lines and the coordinate positions of the ideal traveling lines are further apart than the predetermined interval, the CPU 28 determines that the own vehicle traveling lines and the ideal traveling lines do not overlap by the predetermined proportion or more, and moves on to the processing of step S210. The processing of step S210 is described later.

In step S206, the CPU 28 notifies the driver by voice. Namely, by the function of the notification section 84, the CPU 28 outputs a voice from the speaker 52. Concretely, the notification section 84 notifies the driver by voice of the fact that the own vehicle traveling lines overlap the ideal traveling lines by a predetermined proportion or more.

In step S208, the CPU 28 displays a predetermined word on the windshield glass 18. Concretely, by the function of the notification section 84, the CPU 28 projects a word onto the windshield glass 18 from the head-up display device 40. In the present embodiment, as illustrated in FIG. 10, the word "Good!" is projected onto the windshield glass 18. Then, the CPU 28 ends the display control processing.

On the other hand, in a case in which the determination in step S204 is negative, the CPU 28 moves on to the processing of step S210, and gives the driver driving instructions by voice. Concretely, by the function of the driving instructing section 68, the CPU 28 gives the driver, by at least one of voice and display, instructions relating to driving operations for causing the own vehicle traveling lines to approach the ideal traveling lines. Then, the CPU 28 ends the display control processing.

As described above, in the present embodiment, by displaying the pair of left and right own vehicle traveling line RL1 and own vehicle traveling line LL1 and the pair of left and right ideal traveling line RL2 and ideal traveling line LL2, the driver can instinctively grasp the transverse direction length of the vehicle 82.

Further, in the present embodiment, by providing a notification in a case in which the own vehicle traveling lines overlap the ideal traveling lines by a predetermined proportion or more, the desire on the part of the driver to travel on the ideal traveling lines can be increased. Other operations are similar to those of the first exemplary embodiment.

Note that the above-described second exemplary embodiment is structured such that the driver is notified in a case in which the own vehicle traveling lines overlap the ideal traveling lines by a predetermined proportion or more, but the present disclosure is not limited to this. For example, the structure of the modified example illustrated in FIG. 13 may be employed.

(Modified Example)

Figure 13:
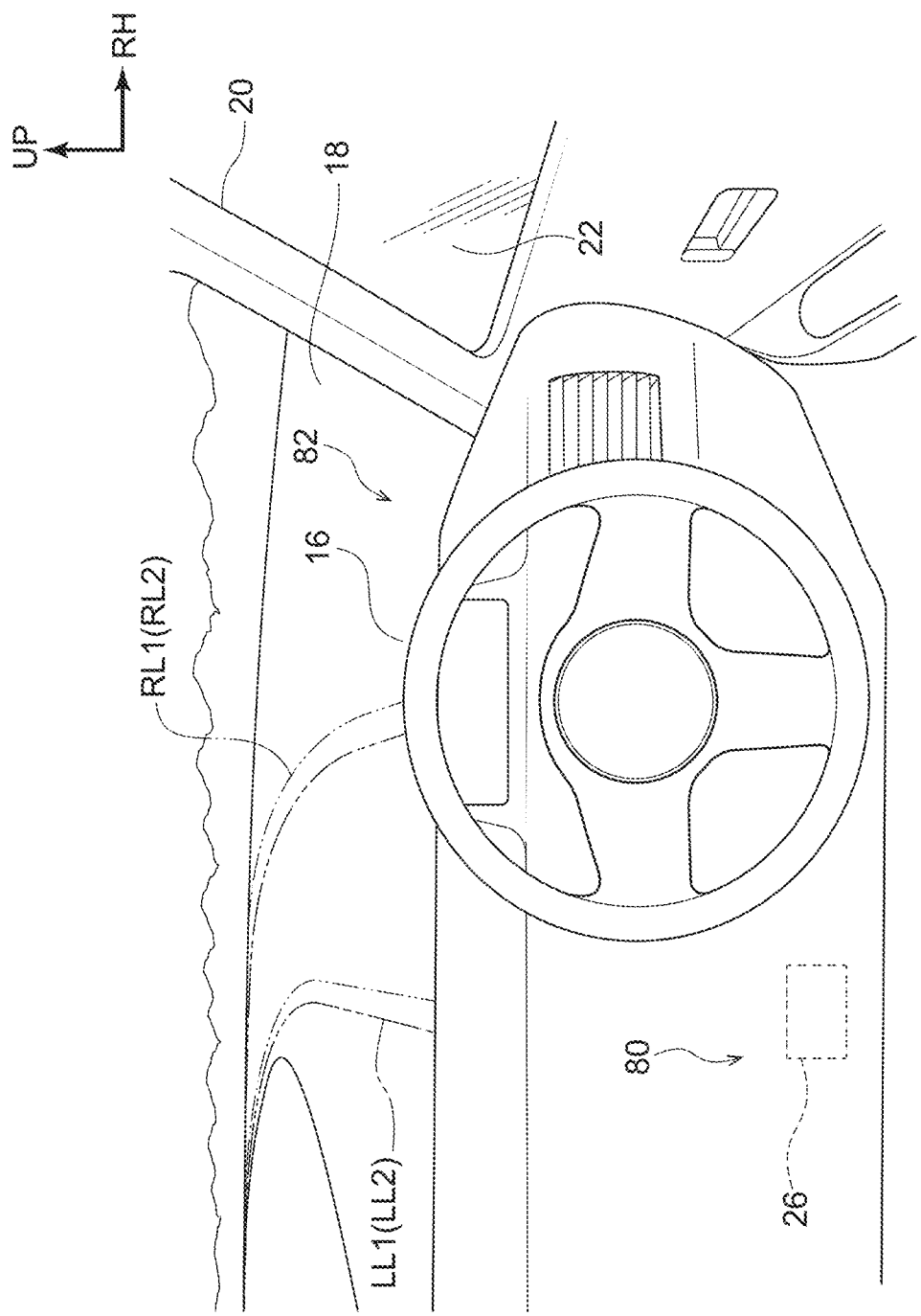
FIG. 13 is a drawing illustrating an example of display in a case in which the own vehicle traveling lines overlap the ideal traveling lines in a modified example of the second exemplary embodiment.

As illustrated in FIG. 13, the present modified example differs from the second exemplary embodiment with regard to the point that display of the own vehicle traveling line RL1, the own vehicle traveling line LL1, the ideal traveling line RL2 and the ideal traveling line LL2 is stopped.

Concretely, in a case in which the own vehicle traveling lines RL1, LL1 and the ideal traveling lines RL2, LL2 overlap by a predetermined proportion or more, the display control section 66 of the present modified example stops the display of the own vehicle traveling lines RL1, LL1 and the ideal traveling lines RL2, LL2.

Further, after stopping display of the own vehicle traveling lines RL1, LL1 and the ideal traveling lines RL2, LL2 for a predetermined time period, the display control section 66 again determines whether or not the own vehicle traveling lines RL1, LL1 and the ideal traveling lines RL2, LL2 overlap by a predetermined proportion or more. Then, in a case in which own vehicle traveling lines RL1, LL1 overlap the ideal traveling lines RL2, LL2 by a predetermined proportion or more, the display control section 66 continues the stoppage of display. On other hand, in a case in which the own vehicle traveling lines RL1, LL1 do not overlap the ideal traveling lines RL2, LL2 by a predetermined proportion or more, the display control section 66 again displays the own vehicle traveling lines RL1, LL1 and the ideal traveling lines RL2, LL2.

As described above, in the present modified example, the annoyance can be reduced as compared with a case in which the own vehicle traveling lines RL1, LL1 and the ideal traveling lines RL2, LL2 are always displayed. Note that, in a case in which the own vehicle traveling lines RL1, LL1 overlap the ideal traveling lines RL2, LL2 by a predetermined proportion or more, display may be stopped after notification by the notification section 84 is given.

Although the vehicle display devices 10, 80 relating to the first exemplary embodiment and the second exemplary embodiment have been described above, the present disclosure can, of course, be implemented in various forms within a scope that does not depart from the gist thereof. For example, the above-described first exemplary embodiment is structured such that, in a case in which a low-speed scenario is determined by the traveling scenario determination section 64, display of the own vehicle traveling line L1 and the ideal traveling line L2 is stopped, but the present disclosure is not limited to this, and the own vehicle traveling line L1 and the ideal traveling line L2 may always be displayed. Further, in a low-speed scenario, the driver's attention may be directed elsewhere by lowering the brightness and the contrast of the own vehicle traveling line L1 and the ideal traveling line L2. Moreover, the display control section 66 may be structured so as to display the own vehicle traveling line L1 and the ideal traveling line L2 only in predetermined traveling scenarios. For example, there may be a structure in which the own vehicle traveling line L1 and the ideal traveling line L2 are displayed only in a case in which there is a sharp curve ahead, a case in which there are continuous curves, a case in which the vehicle is merging, a case of traveling on a road exclusively used for automobiles, or the like. The same holds for the second exemplary embodiment as well.

Further, in the above-described first exemplary embodiment, the display control section 66 displays the own vehicle traveling line L1 and the ideal traveling line L2 in different colors, in accordance with the intervehicle distance and the relative speed between the vehicle ahead and the vehicle 12. However, the present disclosure is not limited to this. For example, even in a situation in which there is no vehicle that is traveling ahead, in a case in which a speed that is greater than or equal to that needed is sensed right before a curve, the own vehicle traveling line L1 and the ideal traveling line L2 may be displayed in red so as to urge the driver to decelerate. The same holds for the second exemplary embodiment as well.

Moreover, the above-described first exemplary embodiment is structured such that the driving mode is switched between the normal driving mode and the expert driving mode by the driving mode switching section 70, but the present disclosure is not limited to this, and may be structured so as to not switch the driving mode. Or, conversely, there may be a structure that can switch between three or more driving modes.

Moreover, the above-described second exemplary embodiment is structured such that the notification section 84 notifies the driver by both voice and display from the head-up display device 40 and the speaker 52, but the present disclosure is not limited to this. For example, the notification section 84 may not carry out voice notification, and may notify the driver by only the display of words. In this case, the annoyance that other vehicle occupants feel can be suppressed. Further, although the above-described second exemplary embodiment is structured such that the notification section 84 displays the word "Good!" on the windshield glass 18, the present disclosure is not limited to this, and other words and symbols may be displayed.

Still further, any of various types of processors other than the CPU 28 may execute the display processings that are executed by the CPU 28 reading-in programs in the above-described first exemplary embodiment and second exemplary embodiment. Examples of processors in this case include PLDs (Programmable Logic Devices) whose circuit structure can be changed after production such as FPGAs (Field-Programmable Gate Arrays) and the like, and dedicated electrical circuits that are processors having circuit structures that are designed for the sole purpose of executing specific processings such as ASICs (Application Specific Integrated Circuits) and the like, and the like. Further, the display control processings may be executed by one of these various types of processors, or may be executed by a combination of two or more of the same type or different types of processors, e.g., plural FPGAs, or a combination of a CPU and an FPGA, or the like. Further, the hardware structures of these various types of processors are, more concretely, electrical circuits that combine circuit elements such as semiconductor elements and the like.

Further, the above first exemplary embodiment and second exemplary embodiment are structured such that various data are stored in the storage 34, but the present disclosure is not limited to this. For example, a recording medium such as a CD (Compact Disk), a DVD (Digital Versatile Disk), a USB (Universal Serial Bus) memory, or the like may be used as the storage. In this case, various programs and data and the like are stored on the recording medium.

What is claimed is:

1. A vehicle display device comprising a processor, wherein the processor:
   acquires images of a region ahead of a vehicle;
   acquires vehicle information relating to traveling of the vehicle;
   predicts an own vehicle traveling line that is a traveling path of the vehicle, based on the acquired vehicle information;
   derives an ideal traveling line that is a proper traveling path, based on the acquired images of the region ahead of the vehicle;
   displays the own vehicle traveling line and the ideal traveling line so as to be superposed on a view in front of a driver's seat; and
   notifies a driver in a case in which the own vehicle traveling line overlaps the ideal traveling line by a predetermined proportion or more.

2. The vehicle display device of claim 1, wherein the processor stops display of the own vehicle traveling line and the ideal traveling line in a case in which a vehicle speed is less than or equal to a predetermined threshold value.

3. The vehicle display device of claim 1, wherein the processor stops display of the own vehicle traveling line and the ideal traveling line in a case in which a predetermined obstacle is sensed in front of the vehicle.

4. The vehicle display device of claim 1, wherein the processor displays the own vehicle traveling line and the ideal traveling line in different colors.

5. The vehicle display device of claim 1, wherein the processor displays the own vehicle traveling line and the ideal traveling line in shapes of bands that become narrower and darker from near to far.

6. The vehicle display device of claim 1, wherein the processor outputs, to the driver, an instruction relating to driving operation for causing the own vehicle traveling line to approach the ideal traveling line.

7. The vehicle display device of claim 1, wherein the processor displays each of the own vehicle traveling line and the ideal traveling line as a single line that extends from a transverse direction central portion of the vehicle.

8. The vehicle display device of claim 1, wherein the processor displays each of the own vehicle traveling line and the ideal traveling line as a pair of lines that extend from transverse direction both sides of the vehicle.

9. The vehicle display device of claim 1, wherein the processor changes a color of the own vehicle traveling line in accordance with an intervehicle distance and a relative speed between an own vehicle and a vehicle ahead that is traveling in front of the own vehicle.

10. A vehicle display device comprising a processor, wherein the processor:
    acquires images of a region ahead of a vehicle;
    acquires vehicle information relating to traveling of the vehicle;
    predicts an own vehicle traveling line that is a traveling path of the vehicle, based on the acquired vehicle information;
    derives an ideal traveling line that is a proper traveling path, based on the acquired images of the region ahead of the vehicle;
    displays the own vehicle traveling line and the ideal traveling line so as to be superposed on a view in front of a driver's seat; and stops display of the own vehicle traveling line and the
ideal traveling line for a predetermined time period, in
a case in which the own vehicle traveling line overlaps
the ideal traveling line by a predetermined proportion
or more.

* * * * *